United States Patent
Kouno

(10) Patent No.: US 9,014,482 B2
(45) Date of Patent: Apr. 21, 2015

(54) ELONGATION MEASURING APPARATUS, ELONGATION MEASUREMENT SYSTEM, AND NON-TRANSITORY MEDIUM

(75) Inventor: Kouji Kouno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 25 days.

(21) Appl. No.: 13/511,097

(22) PCT Filed: Nov. 5, 2010

(86) PCT No.: PCT/JP2010/069697
§ 371 (c)(1),
(2), (4) Date: May 21, 2012

(87) PCT Pub. No.: WO2011/065203
PCT Pub. Date: Jun. 3, 2011

(65) Prior Publication Data
US 2012/0269447 A1    Oct. 25, 2012

(30) Foreign Application Priority Data
Nov. 30, 2009    (JP) ................. 2009-272673

(51) Int. Cl.
G06K 9/46    (2006.01)
G01B 11/02    (2006.01)
B65G 43/02    (2006.01)
G01B 11/04    (2006.01)
F16G 13/06    (2006.01)

(52) U.S. Cl.
CPC ............... *G01B 11/02* (2013.01); *B65G 43/02* (2013.01); *G01B 11/04* (2013.01); *F16G 13/06* (2013.01)

(58) Field of Classification Search
None
See application file for complete search history.

(56) References Cited

U.S. PATENT DOCUMENTS

| 5,291,131 | A | * | 3/1994 | Suzuki et al. ................. 324/206 |
| 5,315,666 | A | * | 5/1994 | Norton-Wayne ............. 382/111 |
| 5,482,154 | A | * | 1/1996 | Affeldt et al. ............ 198/370.04 |
| 5,563,392 | A | * | 10/1996 | Brown et al. ................. 235/91 R |
| 6,862,939 | B2 | * | 3/2005 | Frost ................................. 73/828 |
| 6,892,939 | B2 | * | 5/2005 | Silver et al. ................... 235/375 |
| 2004/0226805 | A1 | * | 11/2004 | Lodge ..................... 198/810.02 |
| 2008/0047804 | A1 | * | 2/2008 | Rathbun et al. ............ 198/502.1 |

(Continued)

FOREIGN PATENT DOCUMENTS

| CN | 201739453 U | 2/2011 |
| JP | 10-030923 | 2/1998 |

(Continued)

OTHER PUBLICATIONS

"Percentage change". Wikipedia, The Free Encyclopedia. Wikimedia Foundation, Inc. Oct. 26, 2009.*

*Primary Examiner* — Stephen R Koziol
*Assistant Examiner* — Jonathan S Lee
(74) *Attorney, Agent, or Firm* — Muncy, Geissler, Olds & Lowe, P.C.

(57) ABSTRACT

The present invention provides an elongation measuring apparatus, an elongation measurement system and a non-transitory medium recording a computer program, which enable measurement of an elongation of a chain without presetting a distance between rollers before use. Based on an image of three or more pins, two adjacent inter-pin distances are each calculated. As a result of a comparison between the two calculated inter-pin distances, the longer distance is determined as a pitch of an inner link and the shorter distance is determined as a pitch of an outer link. The outer link is not elongated while only the inner link is elongated, and therefore, a ratio of a difference between both of the pitches to the pitch of the outer link is determined as an elongation of a chain.

15 Claims, 11 Drawing Sheets

(56) References Cited

U.S. PATENT DOCUMENTS

2009/0049004 A1* 2/2009 Nurminen et al. .......... 707/1
2011/0093218 A1* 4/2011 Vozner .......................... 702/34

FOREIGN PATENT DOCUMENTS

| JP | 10-115676 A | 5/1998 |
| JP | 10-288510 A | 10/1998 |
| JP | 10288510 A * | 10/1998 |
| JP | 10-300426 | 11/1998 |
| JP | 10-332342 A | 12/1998 |
| JP | 2000-291748 A | 10/2000 |
| JP | 2000291748 A * | 10/2000 |
| JP | 2002-7600 A | 1/2002 |
| JP | 2008-62733 A | 3/2008 |
| JP | 2009-74882 A | 4/2009 |

* cited by examiner

F I G. 1
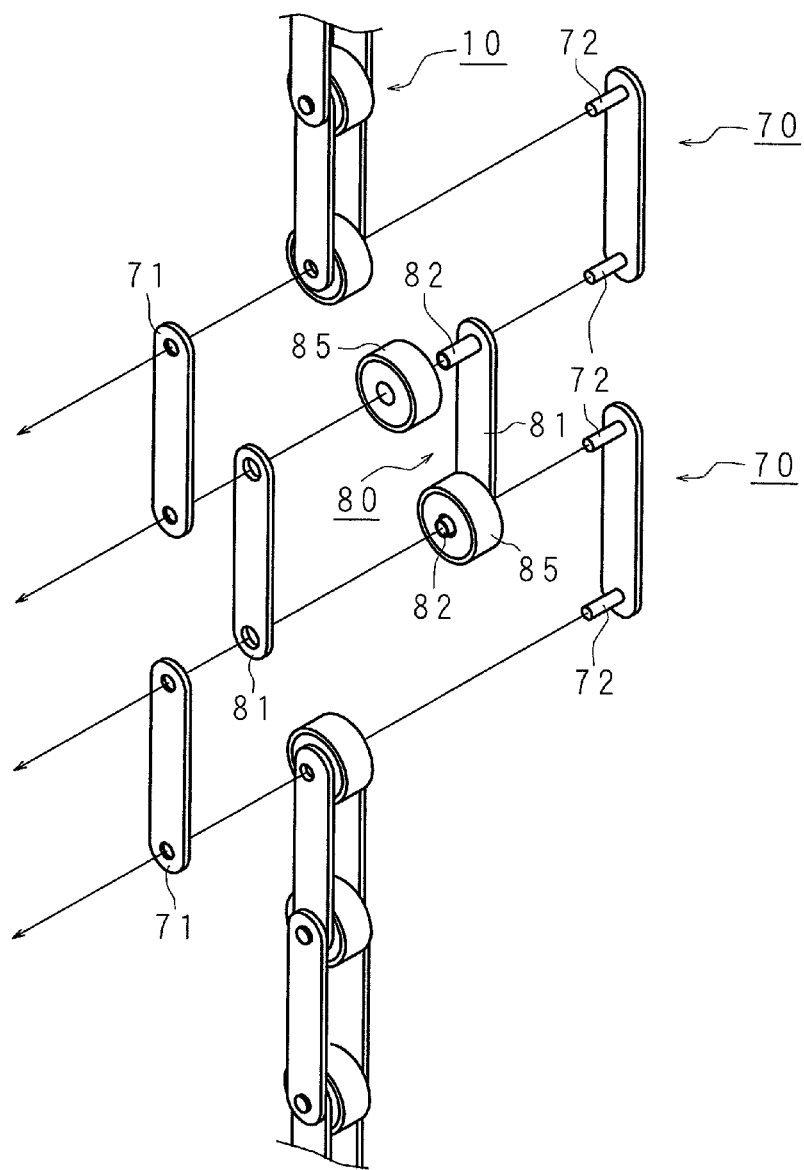

FIG. 4A

| IMAGE-TAKING POSITION | CHAIN ID | NAME OF USER | DELIVERY DESTINATION | DELIVERY ADDRESS | IMAGE-TAKING DATA ADDRESS |
|---|---|---|---|---|---|
| DEGREES NORTH A°,B′,C″ DEGREES EAST D°,E′,F″ | ○○○○ | △△ CO. LTD. | xx OFFICE | □□□□□□ | ****** |
| ⋮ | ⋮ | ⋮ | ⋮ | ⋮ | ⋮ |
| ⋮ | ⋮ | ⋮ | ⋮ | ⋮ | ⋮ |

FIG. 4B

DEGREES NORTH A°,B′,C″ DEGREES EAST D°,E′,F″

| IMAGE-TAKING TIME | ELONGATION | REPLACEMENT FLAG | WARNING FLAG |
|---|---|---|---|
| xx (MONTH), △△ (DAY), ○○○○ (YEAR) | a% | 0 | 1 |
| □□ (MONTH), xx (DAY), ○○○○ (YEAR) | b% | 0 | 0 |
| ** (MONTH), ## (DAY), ○○○○ (YEAR) | c% | 1 | 0 |

ELONGATION MEASURING APPARATUS, ELONGATION MEASUREMENT SYSTEM, AND NON-TRANSITORY MEDIUM

This application is the national phase under 35 U.S.C. §371 of PCT International Application No. PCT/JP2010/069697 which has an International filing date of Nov. 5, 2010 and designated the United States of America.

BACKGROUND

1. Technical Field

When regular maintenance is performed on a chain in which a plurality of inner links and a plurality of outer links are alternately connected to each other so as to be wrapped around a sprocket and ends of the chain are coupled to each other via a joint link to carry out product conveyance or power transmission, the following method is performed. The joint link is removed, and the chain is detached from the sprocket; then, a measurement is performed on a length of the chain, and when a difference between an initial length and a length measured after use reaches a reference value, the chain is replaced, thus preventing occurrence of an accident. However, the foregoing method requires a lot of time and effort for detachment/attachment of the chain, and also has a problem that an operation in a facility equipped with the chain must be stopped for a long period of time.

2. Description of Related Art

Therefore, Japanese Unexamined Patent Application Publication No. 10-332342 discloses the following method. A light beam elongated in a longitudinal direction of a chain is applied to peripheral surfaces of two rollers included in a plurality of rollers of the chain, and an image of a region to which the light beam is applied is taken to obtain two arc-shaped images indicative of outline regions of the rollers; then, points of intersection between straight lines, each of which is parallel to the longitudinal direction of the chain and intersects the associated image at two positions, and the images are determined, and center positions of the rollers are calculated by a computer based on the determined intersection points, so that an elongation of the chain is detected based on a distance between the calculated center positions. The use of the foregoing method enables the detection of the chain elongation without detaching the chain.

SUMMARY

However, in the foregoing method, a distance measured between the two rollers of the chain before use has to be preset in the computer, and therefore, the chain elongation cannot be detected when the distance measured between the two rollers before use is unknown.

The present invention has been made in view of the above-described circumstances, and an object of the present invention is to provide an elongation mesuring appratus, an elongation measurement system and a non-transitory medium which enable measurement of an elongation of a chain without presetting a distance measured between rollers before use.

According to the present invention, there is provided an elongation mesuring appratus for measuring an elongation of a chain based on a taken image of the chain in which a plurality of inner links and a plurality of outer links are alternately connected to each other by internally fitting pins of the outer links into cylindrical bushings of the inner links, the elongation mesuring appratus including: an inter-pin distance calculation section for calculating adjacent inter-pin distances based on an image of the three or more aligned pins; a pitch calculation section for calculating a pitch of the outer link and a pitch of the inner link based on the calculated inter-pin distances; and an elongation calculation section for calculating the elongation of the chain based on the calculated pitches of the outer and inner links.

According to the present invention, there is provided the elongation mesuring appratus, wherein the elongation calculation section calculates a ratio of a difference between the pitches of the inner and outer links to the pitch of the outer link.

According to the present invention, there is provided the elongation mesuring appratus, wherein the inter-pin distance calculation section calculates the inter-pin distances based on an image of the four or more aligned pins, wherein the pitch calculation section corrects the calculated pitches of the outer and inner links by coefficients having a linear relationship, and wherein the elongation calculation section calculates the elongation of the chain based on the corrected pitches of the outer and inner links.

According to the present invention, there is provided the elongation mesuring appratus, wherein the elongation mesuring appratus outputs the elongation calculated by the elongation calculation section.

According to the present invention, there is provided an elongation measurement system including: the foregoing elongation mesuring appratus including a measurement section for measuring a position at which the image of the chain is taken, and a timing section for measuring a time at which the image of the chain is taken; and a server that stores the elongation calculated by the elongation calculation section, the position measured by the measurement section, and the time measured by the timing section.

According to the present invention, there is provided the elongation measurement system, wherein the elongation stored in the server is transmitted to an external device associated with the position.

According to the present invention, there is provided the elongation measurement system, wherein when the elongation stored in the server exceeds a given value, information indicating that the elongation exceeds the given value is transmitted to the external device from the server.

According to the present invention, there is provided the elongation measurement system, wherein the server calculates, based on the time and the calculated elongation, a temporal change rate of the elongation, and when the calculated temporal change rate exceeds a given value, the server transmits information, indicating that the temporal change rate exceeds the given value, to the external device.

According to the present invention, there is provided an elongation measurement system including: a terminal device for taking an image of a chain in which a plurality of inner links and a plurality of outer links are alternately connected to each other by internally fitting pins of the outer links into cylindrical bushings of the inner links; and a server for calculating an elongation of the chain based on the image of the chain taken by the terminal device, wherein the server includes: an inter-pin distance calculation section for calculating adjacent inter-pin distances based on an image of the three or more aligned pins; a pitch calculation section for calculating a pitch of the outer link and a pitch of the inner link based on the calculated inter-pin distances; and an elongation calculation section for calculating the elongation of the chain based on the calculated pitches of the outer and inner links.

According to the present invention, there is provided the elongation measurement system, wherein the elongation calculation section calculates a ratio of a difference between the pitches of the inner and outer links to the pitch of the outer link.

According to the present invention, there is provided the elongation measurement system, wherein the inter-pin distance calculation section calculates the inter-pin distances based on an image of the four or more aligned pins, wherein the pitch calculation section corrects the calculated pitches of the outer and inner links by coefficients having a linear relationship, and wherein the elongation calculation section calculates the elongation of the chain based on the corrected pitches of the outer and inner links.

According to the present invention, there is provided the elongation measurement system, wherein the terminal device outputs the elongation calculated by the elongation calculation section.

According to the present invention, there is provided the elongation measurement system, wherein the terminal device includes: a measurement section for measuring a position at which the image of the chain is taken; and a timing section for measuring a time at which the image of the chain is taken, and wherein the server stores: the calculated elongation; the position measured by the measurement section; and the time measured by the timing section.

According to the present invention, there is provided the elongation measurement system, wherein the server transmits the stored elongation to an external device associated with the position.

According to the present invention, there is provided the elongation measurement system, wherein when the stored elongation exceeds a given value, the server transmits information, indicating that the elongation exceeds the given value, to the external device.

According to the present invention, there is provided the elongation measurement system, wherein the server calculates, based on the time and the calculated elongation, a temporal change rate of the elongation, and when the calculated temporal change rate exceeds a given value, the server transmits information, indicating that the temporal change rate exceeds the given value, to the external device.

According to the present invention, there is provided a non-transitory medium recording a computer program for allowing a computer to function as a section for calculating an elongation of a chain based on a taken image of the chain in which a plurality of inner links and a plurality of outer links are alternately connected to each other by internally fitting pins of the outer links into cylindrical bushings of the inner links, wherein the computer program allows the computer to function as: an inter-pin distance calculation section for calculating adjacent inter-pin distances based on an image of the three or more aligned pins; a pitch calculation section for calculating a pitch of the outer link and a pitch of the inner link based on the calculated inter-pin distances; and an elongation calculation section for calculating the elongation of the chain based on the calculated pitches of the outer and inner links.

In the present invention, based on the image of the three or more aligned pins, the adjacent inter-pin distances are each calculated, so that the pitches of the outer and inner links are calculated. Then, based on the calculated pitches of the outer and inner links, the elongation of the chain is calculated.

In the present invention, when the image of the three pins is taken, the two inter-pin distances (pitches of the outer and inner links) are calculated. Due to the structure of the chain, dimensions of the outer links virtually do not change between before and after use of the chain, but dimensions of the inner links after use are elongated as compared with those of the inner links before use. Hence, a comparison is made between the two calculated inter-pin distances, so that the longer distance is determined as the pitch of the inner link and the shorter distance is determined as the pitch of the outer link. Further, since the pitch of the outer link and the pitch of the inner link are substantially equal to each other before use, the ratio of a difference between both of the pitches to the pitch of the outer link is determined as the elongation of the chain.

In the present invention, based on the image of the four or more aligned pins, the three or more inter-pin distances are calculated. Then, the calculated inter-pin distances are corrected by the coefficients having a linear relationship, and thus errors in the inter-pin distances, which occur when the image of the chain is taken from an oblique position, are corrected.

In the present invention, the elongation of the chain is outputted, thus allowing an operator or a user to recognize the elongation of the chain.

In the present invention, the calculated elongation of the chain is stored in the server together with the position and time at which the image of the chain is taken, thus meticulously managing a state of the chain.

In the present invention, the position at which the chain is set is associated with the computer (external device) used by the user, and the measured chain elongation is transmitted from the server to the computer used by the user, thereby informing the user of the elongation.

In the present invention, when the elongation of the chain exceeds the given value, information indicative of this fact is transmitted from the server to the computer of the user, thereby prompting the user to replace the chain.

In the present invention, when the temporal change rate of the elongation of the chain exceeds the given value, information indicative of this fact is transmitted from the server to the computer of the user, thereby informing the user of the possibility that an abnormal condition has occurred in the chain.

In the present invention, based on the image of the three or more aligned pins, the adjacent inter-pin distances are each calculated. Then, based on the calculated pitches of the outer and inner links, the elongation of the chain is calculated, thus making it possible to measure the elongation of the chain without presetting the inter-pin distance before use.

In the present invention, the pitches of the outer and inner links are calculated. When the image of the three pins is taken, the two inter-pin distances (pitches of the outer and inner links) are calculated. Due to the structure of the chain, dimensions of the outer links virtually do not change between before and after use of the chain, but dimensions of the inner links after use are elongated as compared with those of the inner links before use. Hence, a comparison is made between the two calculated inter-pin distances, so that the longer distance is determined as the pitch of the inner link and the shorter distance is determined as the pitch of the outer link. Further, since the pitch of the outer link and the pitch of the inner link are substantially equal to each other before use, the ratio of a difference between both of the pitches to the pitch of the outer link is determined as the elongation of the chain, thus making it possible to measure the elongation of the chain without presetting the inter-pin distance before use.

In the present invention, based on the image of the four or more aligned pins, the three or more inter-pin distances are calculated, and the calculated inter-pin distances are corrected by the coefficients having a linear relationship. Hence, even when the image of the chain is taken from an oblique position and thus a distortion occurs in the image of the chain, errors in the inter-pin distances caused by the image distortion are corrected, and the pitches of the outer and inner links are accurately calculated, thus making it possible to accurately obtain the elongation of the chain.

In the present invention, the user can reliably recognize the elongation of the chain, and thus can immediately recognize whether or not the chain should be replaced.

In the present invention, the calculated elongation of the chain is stored in the server together with the position and time at which the image of the chain is taken, so that the state of the chain is meticulously managed, thus making it possible to take appropriate measures for the chain.

In the present invention, the position at which the chain is set is associated with the computer (external device) used by the user, and the measured chain elongation is transmitted from the server to the computer, used by the user, to inform the user of the elongation, thus allowing the user to reliably recognize the chain that should be replaced.

In the present invention, when the elongation of the chain exceeds the given value, information indicative of this fact is transmitted from the server to the computer of the user, thereby making it possible to prompt the user to replace the chain that should be replaced.

In the present invention, when the temporal change rate of the elongation of the chain exceeds the given value, information indicative of this fact is transmitted from the server to the computer of the user to inform the user of the possibility that an abnormal condition has occurred in the chain, thereby making it possible to prompt the user to stop the use of the chain and replace the chain, for example.

BRIEF DESCRIPTION OF THE DRAWINGS

FIG. 1 is an exploded view schematically illustrating a chain.

FIG. 4A is an identification table in which data such as image-taking positions and chain IDs is stored and by which a chain is identified.

FIG. 4B is an individual table in which data such as image-taking times and elongations is stored so as to be associated with an image-taking position and by which states of the chain are individually grasped.

DETAILED DESCRIPTION (Embodiment 1)

Figure 2:
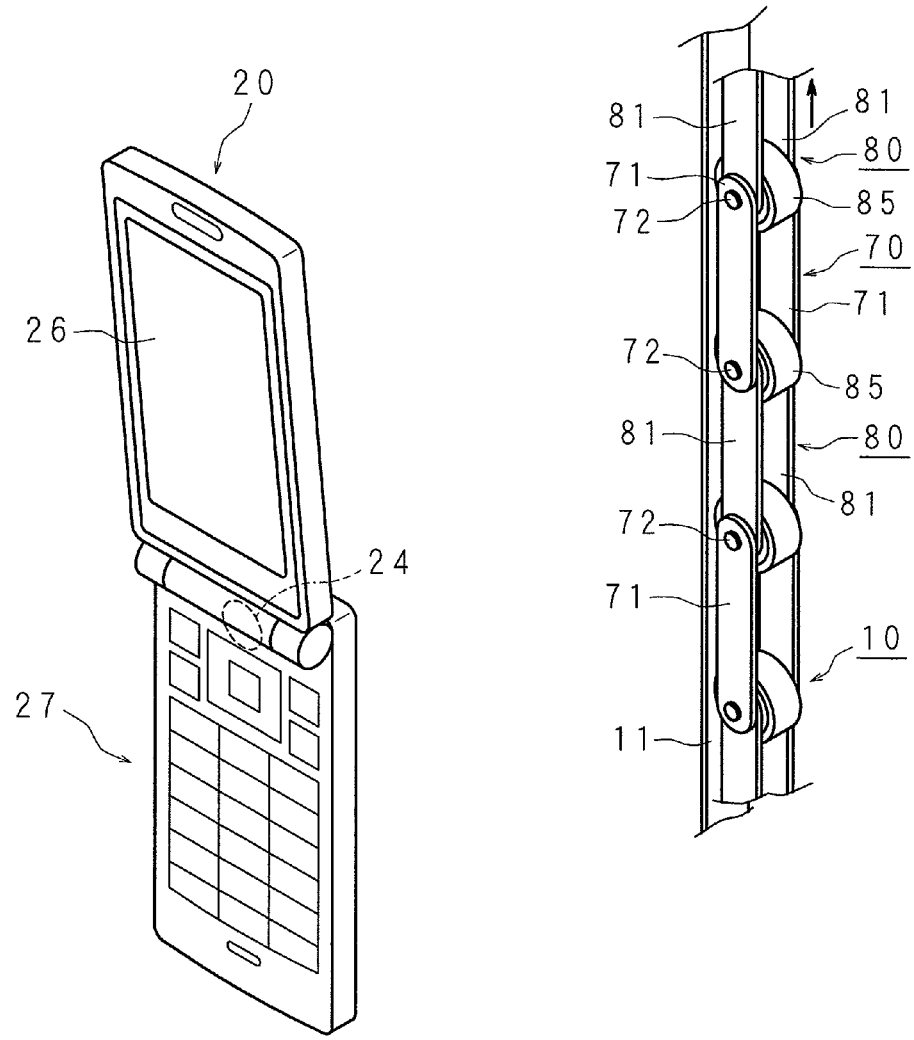
FIG. 2 is a perspective view schematically illustrating the chain and a terminal device of an elongation measurement system according to Embodiment 1.

Hereinafter, the present invention will be described in detail with reference to the drawings illustrating an elongation measurement system according to Embodiment 1. FIG. 1 is an exploded view schematically illustrating a chain.

In FIG. 1, "80" denotes an inner link, and each inner link 80 includes two inner plates 81, 81 facing each other. Each inner plate 81 is formed by an elliptical flat plate member, and two holes are provided at ends of each flat plate member. Ends of two cylindrical bushings 82, 82 are interference fitted into the two holes of one of the inner plates 81, and the other ends of the bushings 82, 82 are interference fitted into the two holes of the other inner plate 81, thus connecting the two inner plates 81, 81 to each other. Annular rollers 85, 85 are rotatably externally fitted to the bushings 82, 82.

The inner links 80 are located inwardly of outer links 70. Each outer link 70 includes two outer plates 71, 71 facing each other. Each outer plate 71 is formed by an elliptical flat plate member having a size approximately equal to that of the inner plate 81, and two holes are provided at ends of each flat plate member. Diameters of the holes provided in the outer plates 71 are smaller than those of the holes provided in the inner plates 81. Ends of cylindrical columnar pins 72, 72 are interference fitted into the two holes of one of the outer plates 71, 71. A diameter of each cylindrical columnar pin 72 is smaller than an inner diameter of each bushing 82, and the two cylindrical columnar pins 72, 72 are inserted through the bushings 82, 82 of the different inner links 80, 80. Further, the other ends of the cylindrical columnar pins 72, 72 are interference fitted into the two holes of the other one of the outer plates 71, 71, thus connecting the outer plates 71, 71 to each other in such a manner that the associated inner link 80 is sandwiched therebetween. An operation for connecting the outer link 70 and the inner link 80 to each other is repeatedly performed in the above-described manner, thereby assembling an annular chain 10.

Figure 3:
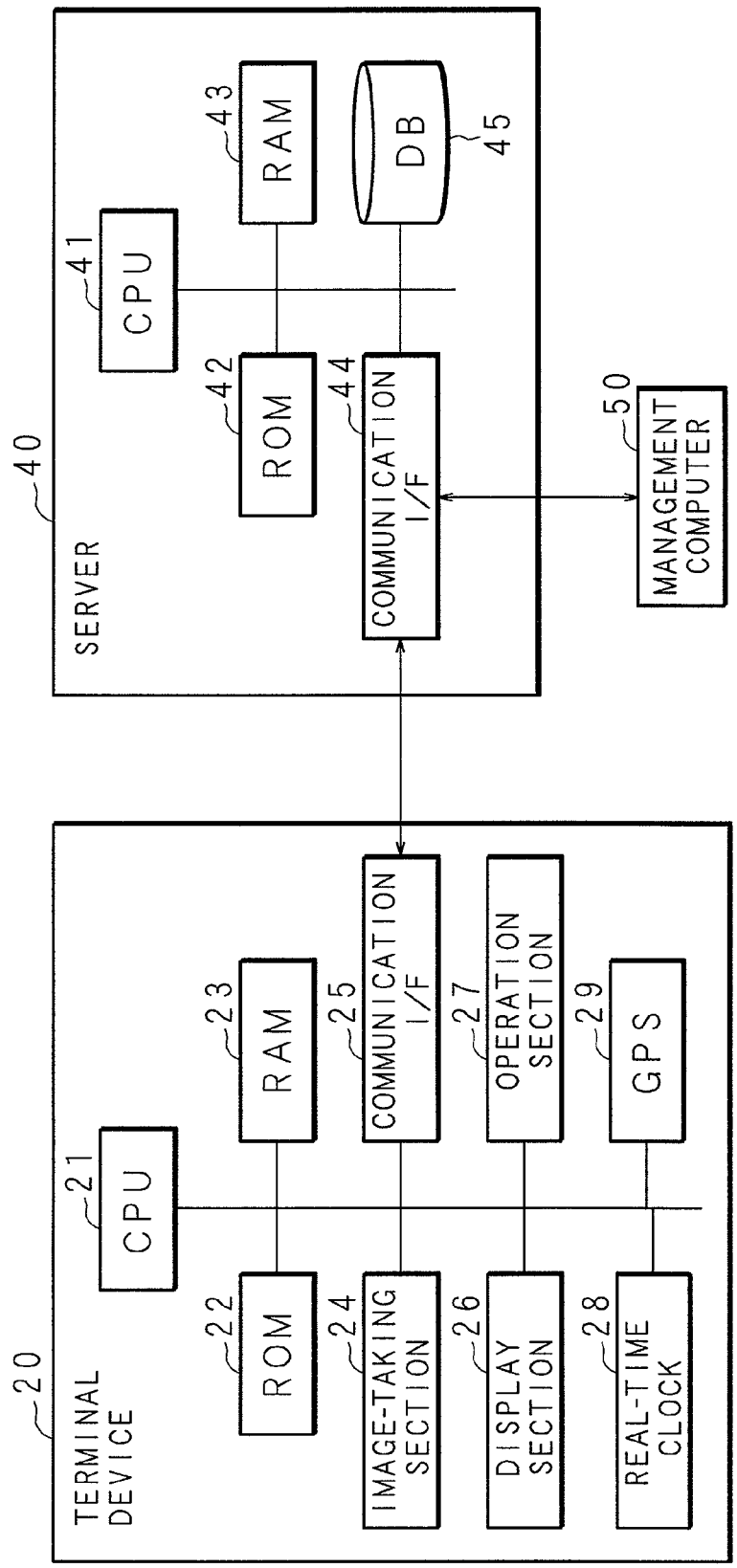
FIG. 3 is a block diagram illustrating a configuration of the elongation measurement system.

FIG. 2 is a perspective view schematically illustrating the chain 10 and a terminal device of an elongation measurement system according to Embodiment 1, and FIG. 3 is a block diagram illustrating a configuration of the elongation measurement system.

The chain 10 is wrapped around an unillustrated sprocket. By driving the sprocket, the chain 10 is moved in a direction indicated by an arrow in FIG. 2. Note that an end of each pin 72 is protruded from the associated outer plate 71 by an appropriate length, and paint is applied to the protruded end of each pin 72 so that each pin 72 can be distinguished from its surroundings when an image of the chain 10 is taken. An operator takes an image of the chain 10 by a terminal device (elongation mesuring appratus) 20.

The terminal device 20 includes: a CPU (Central Processing Unit) 21 for performing arithmetic processing; a rewritable ROM (Read Only Memory) 22 for storing data such as a control program; a RAM (Random Access Memory) 23 for temporarily storing data necessary for arithmetic processing; an image-taking section 24 including a lens and a CCD (Charge Coupled Device); a communication I/F (Interface) 25 for communicating with other devices; a display section 26 for displaying information such as a character and an image; an operation section 27 for receiving an operation performed by the operator; a real-time clock 28 for time measurement;

and a GPS (Global Positioning System) 29 for measuring a position of the terminal device. The foregoing constituent elements of the terminal device are connected to each other via an internal bus. Note that the image-taking section 24 is formed so as to be able to take an image at a sufficiently high speed for a movement speed of the chain 10, and is thus capable of taking a clear image of the chain 10 even when the chain 10 is moving.

The CPU 21 downloads, via the communication I/F 25, an application program from a server 40 described later and stores the application program in the ROM 22 when necessary. Using the RAM 23 as a working area, the CPU 21 reads the application program, which is stored in the ROM 22, into the RAM 23 to execute, based on image-taking data inputted from the image-taking section 24, an elongation calculation process described later, and transmits, via the communication I/F 25, a calculated elongation of the chain 10 to the server together with the image-taking data. Further, via the communication I/F 25, the CPU 21 transmits, to the server 40, an image-taking time measured by the real-time clock 28 and an image-taking position measured by the GPS 29. Furthermore, the CPU 21 allows the display section 26 to display information indicative of the elongation. Note that a method for storing the application program for execution of the elongation calculation process in the ROM 22 is not limited to the foregoing method in which the application program is downloaded and stored. For example, a portable non-transitory medium 100 in which the foregoing application program is recorded may be prepared, the application program may be read from the non-transitory medium 100 by using a driving device (not illustrated) for reading data from a non-transitory medium, and then the read application program may be stored in the ROM 22.

The server 40 includes: a CPU 41 for performing arithmetic processing; a rewritable ROM 42 for storing data such as a control program; a RAM 43 for temporarily storing data necessary for arithmetic processing; a communication I/F 44 for communicating with other devices; and a database 45.

The CPU 41 transmits an application program, which is stored in the ROM 42, to the terminal device 20 via the communication I/F 44. Further, using the RAM 43 as a working area, the CPU 41 reads a management program, which is stored in the ROM 42, into the RAM 43 and performs a management process described later. The CPU 41 receives, via the communication I/F 44, the elongation, image-taking data, image-taking time and image-taking position from the terminal device 20, and stores these pieces of data in the database 45. Furthermore, the CPU 41 communicates with a management computer 50 via the communication I/F 44. Note that the management computer 50 is a computer of a user who uses the chain 10, and examples of the management computer 50 include a PC (Personal Computer) set in an office of the user and a mobile terminal owned by the user. Note that the management program is stored in the ROM 42 in the following manner. For example, a portable non-transitory medium 101 in which the management program is recorded is prepared, the management program is read from the non-transitory medium 101 by using a driving device (not illustrated) for reading data from a non-transitory medium, and then the read management program is stored in the ROM 42. Alternatively, the management program may be stored in the ROM 42 at the time of fabrication thereof or may be downloaded via a network.

FIGS. 4A and 4B are conceptual diagrams each illustrating an example of a management table stored in the database 45. FIG. 4A is an identification table in which data such as image-taking positions and chain IDs is stored and by which the chain 10 is identified, and FIG. 4B is an individual table in which data such as image-taking times and elongations is stored so as to be associated with an image-taking position and by which states of the chain 10 are individually grasped.

As illustrated in FIG. 4A, the identification table stores: image-taking positions at which images of the chain 10 are taken; chain IDs; names of users who use the chain 10; delivery destinations to which the chain 10 is delivered; delivery addresses indicative of addresses of the management computer 50; and image-taking data addresses indicative of locations at which image-taking data is stored. Note that in columns of the chain IDs, user names, delivery destinations, delivery addresses and image-taking data addresses, the chain IDs, user names, delivery destinations, delivery addresses and image-taking data addresses are stored, respectively, so as to be associated with the image-taking positions.

As illustrated in FIG. 4B, data stored in the individual table includes: image-taking times at which images of the chain 10 are taken; elongations of the chain 10; replacement flags indicative of whether or not the chain 10 should be replaced; and warning flags indicative of whether or not an abnormal condition has occurred in the chain 10. Note that the image-taking times, elongations, replacement flags and warning flags are associated with the image-taking position. Further, in an initial state, 0 (i.e., a value indicating that the chain should not be replaced yet and a value indicating that no abnormal condition has occurred) is set for each of the replacement flag and warning flag.

Figure 5:
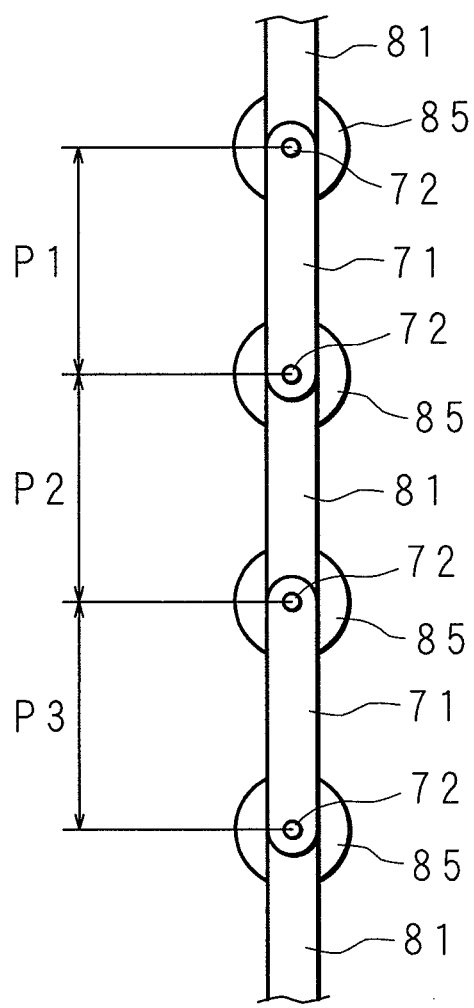
FIG. 5 is an explanatory diagram describing first and second methods for calculating the elongation of the chain.

The CPU 21 of the terminal device 20 calculates an elongation of the chain 10 based on a taken image of the chain 10. FIG. 5 is an explanatory diagram describing first and second methods for calculating the elongation of the chain 10.

The first method for calculating the elongation of the chain 10 will be described.

An image of the chain 10 is taken so that the three or more aligned pins 72, 72, . . . , 72 are included in the taken image, and the taken image of the chain 10 is converted into a binary image. Then, positions of the three adjacent pins 72, 72, . . . , 72 are extracted, the numbers of inter-pin pixels are obtained, and inter-pin distances P1 and P2 are obtained (see FIG. 5). Note that as mentioned above, paint is applied to the end of each pin 72 in order to distinguish each pin 72 from its surroundings, and thus the positions of the pins 72 are reliably extracted.

Subsequently, a comparison is made between the distances P1 and P2, so that the longer distance is determined as a pitch of the inner link 80 and the shorter distance is determined as a pitch of the outer link 70. The foregoing comparison is based on visual recognition that only the inner link 80 appears to be elongated due to wearing away of the pins 72 and the bushings 82.

Then, a difference between the pitch of the inner link 80 and the pitch of the outer link 70 is obtained, and a ratio of the difference to the pitch of the outer link 70 (i.e., the elongation of the chain 10) is obtained. For example, when P2 indicates the pitch of the inner link 80 and P1 indicates the pitch of the outer link 70, the elongation of the chain 10 is obtained by the following expression (a):

$$\{(P2-P1)/P1\} \cdot 100 \qquad (a)$$

Next, the second method for calculating the elongation of the chain 10 will be described. First, an image of the chain 10 is taken so that the four or more aligned pins 72, 72, . . . , 72 are included in the taken image, and the taken image of the chain 10 is converted into a binary image. Then, positions of the four adjacent pins 72, 72, . . . , 72 are extracted, the numbers of inter-pin pixels are obtained, and the inter-pin distances P1, P2 and P3 are obtained (see FIG. 5).

Subsequently, in consideration of the case where the operator takes an image of the chain 10 from an oblique position instead of a face-to-face position with the chain 10, correction coefficients α, β and γ by which the inter-pin distances P1, P2 and P3 are multiplied, respectively, are obtained. Requirements that should be met by the correction coefficients α, β and γ are as follows: (1) the correction coefficients α, β and γ must have a linear relationship; and (2) a relationship expressed by P1·α=P3·γ mush be established.

The requirement (1) is set based on the fact that consideration is given to the case where an image of the chain 10 is taken from an oblique position. The requirement (2) is set based on the fact that when an image of the four continuous pins 72, 72, . . . 72 is taken, both of P1·α and P3·γ indicate lengths of the outer links 71, 71 or lengths of the inner links 81, 81.

Subsequently, a comparison is made between P2·β and P1·α or P3·γ, so that the longer distance is determined as the pitch of the inner link 80 and the shorter distance is determined as the pitch of the outer link 70. The foregoing comparison is based on visual recognition that only the inner link 80 appears to be elongated due to wearing away of the pins 72 and the bushings 82.

Then, a difference between the pitch of the inner link 80 and the pitch of the outer link 70 is obtained, and a ratio of the difference to the pitch of the outer link 70 (i.e., the elongation of the chain 10) is obtained. For example, when P1·α and P3·γ indicate the pitch of the inner link 80 and P2·β indicates the pitch of the outer link 70, the elongation of the chain 10 is obtained by the following expression (b):

$$\{(P1\cdot\alpha - P2\cdot\beta)/P2\cdot\beta 6\}\cdot 100 \quad (b)$$

On the other hand, when P1·α and P3·γ indicate the pitch of the outer link 70 and P2·β indicates the pitch of the inner link 80, the elongation of the chain 10 is obtained by the following expression (c):

$$\{(P2\cdot\beta - P1\cdot\alpha)/P1\cdot\alpha\}\cdot 100 \quad (c)$$

Note that P1·α in the expressions (b) and (c) may be replaced by P3·γ.

Based on the first and second methods, the CPU 21 of the terminal device 20 calculates the elongation of the chain 10.

Figure 6:
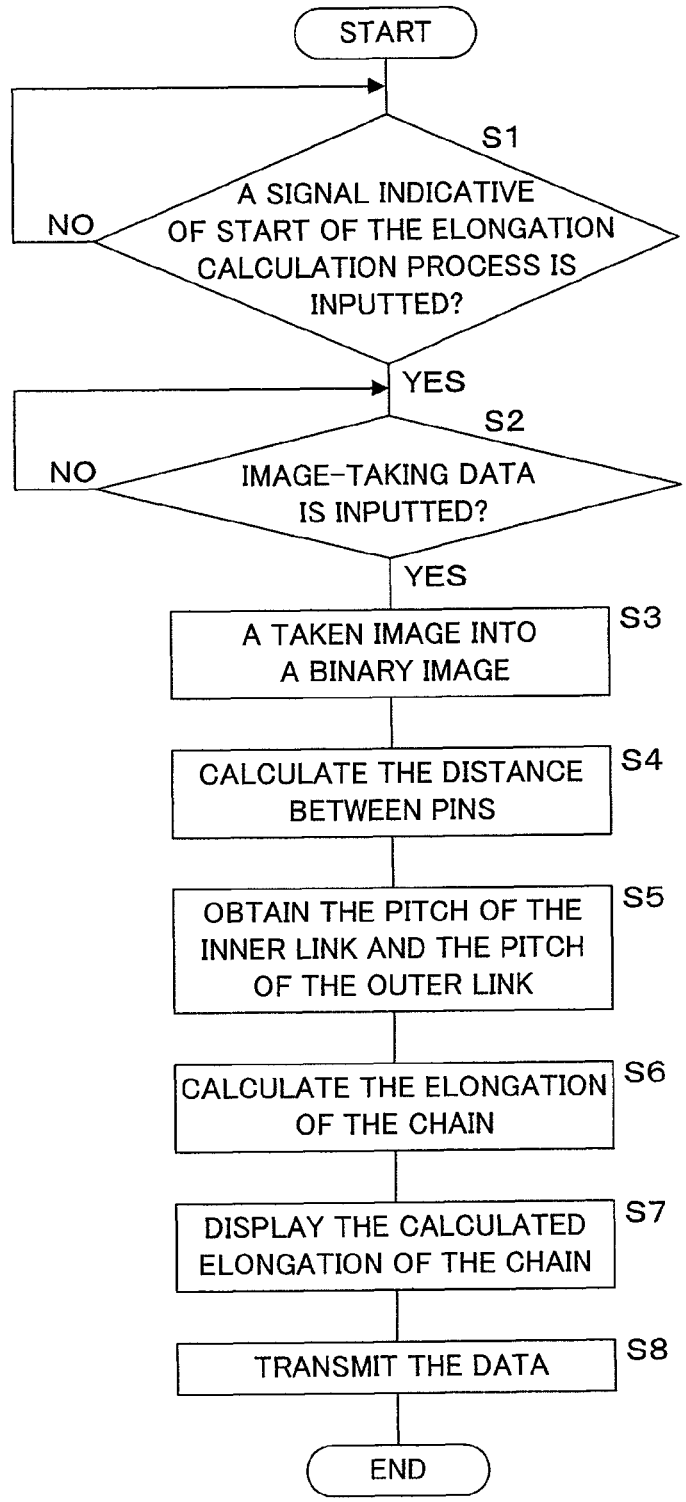
FIG. 6 is a flow chart describing an elongation calculation process performed by a CPU 21 of the terminal device based on the first method.

FIG. 6 is a flow chart describing the elongation calculation process performed by the CPU 21 of the terminal device 20 based on the first method.

The CPU 21 of the terminal device 20 determines whether or not a signal indicative of start of the elongation calculation process is inputted by an operation performed on the operation section 27 (Step S1), and enters a standby mode until the signal indicative of the start of the elongation calculation process is inputted (Step S1: NO). Upon input of the signal indicative of the start of the elongation calculation process (Step S1: YES), the CPU 21 of the terminal device 20 determines whether or not image-taking data is inputted from the image-taking section 24 (Step S2), and enters the standby mode until the image-taking data is inputted (Step S2: NO). Upon input of the image-taking data from the image-taking section 24 (Step S2: YES), the CPU 21 of the terminal device 20 converts a taken image into a binary image (Step S3), and extracts positions of three continuous pins to calculate the inter-pin distances P1 and P2 (Step S4).

Subsequently, the CPU 21 of the terminal device 20 makes a comparison between the distances P1 and P2 to obtain the pitch of the inner link 80 and the pitch of the outer link 70 (Step S5). Then, the CPU 21 of the terminal device 20 calculates the elongation of the chain 10 (Step S6). In this case, the CPU 21 of the terminal device 20 calculates the elongation of the chain 10 by the foregoing expression (a).

Subsequently, the CPU 21 of the terminal device 20 transmits, to the display section 26, a command for displaying the calculated elongation of the chain 10 (Step S7). The display section 26, which has received the command, displays the elongation of the chain 10. Then, the CPU 21 of the terminal device 20 transmits, to the server 40, the elongation of the chain 10, the image-taking data, the image-taking time measured by the real-time clock 28, and the image-taking position measured by the GPS 29 (Step S8).

Figure 7:
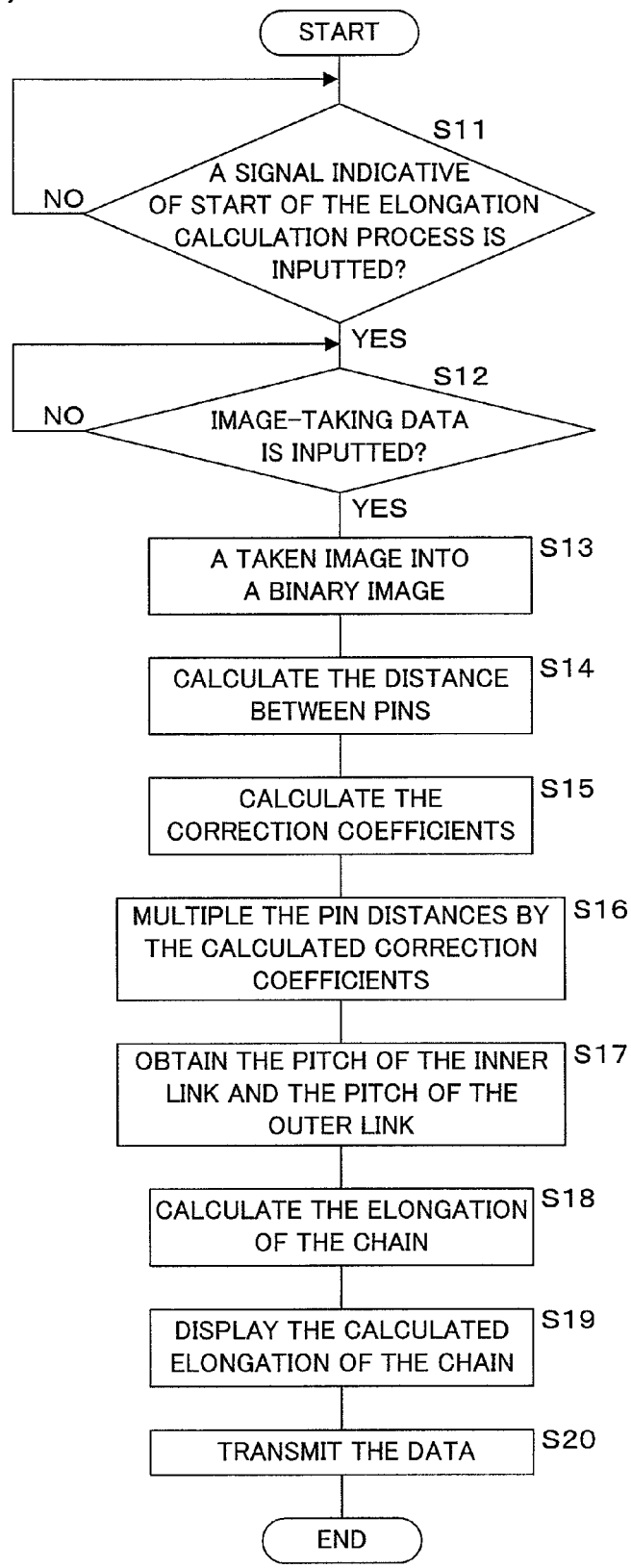
FIG. 7 is a flow chart describing an elongation calculation process performed by the CPU 21 of the terminal device based on the second method.

FIG. 7 is a flow chart describing the elongation calculation process performed by the CPU 21 of the terminal device 20 based on the second method.

The CPU 21 of the terminal device 20 determines whether or not a signal indicative of start of the elongation calculation process is inputted by an operation performed on the operation section 27 (Step S11), and enters a standby mode until the signal indicative of the start of the elongation calculation process is inputted (Step S11: NO). Upon input of the signal indicative of the start of the elongation calculation process (Step S11: YES), the CPU 21 of the terminal device 20 determines whether or not image-taking data is inputted from the image-taking section 24 (Step S12), and enters the standby mode until the image-taking data is inputted (Step S12: NO). Upon input of the image-taking data from the image-taking section 24 (Step S12: YES), the CPU 21 of the terminal device 20 converts a taken image into a binary image (Step S13), and extracts positions of four continuous pins to calculate the inter-pin distances P1, P2 and P3 (Step S14).

Subsequently, the CPU 21 of the terminal device 20 calculates the correction coefficients α, β and γ by the foregoing method (Step S15), and multiples the inter-pin distances P1, P2 and P3 by the calculated correction coefficients α, β and γ, respectively (Step S16). Then, the CPU 21 of the terminal device 20 makes a comparison between P2·β and P1·α or P3·γ to obtain the pitch of the inner link 80 and the pitch of the outer link 70 (Step S17). Subsequently, the CPU 21 of the terminal device 20 calculates the elongation of the chain 10 (Step S18). In this case, the CPU 21 of the terminal device 20 calculates the elongation of the chain 10 by the foregoing expression (b) or (c).

Next, the CPU 21 of the terminal device 20 transmits, to the display section 26, a command for displaying the calculated elongation of the chain 10 (Step S19). The display section 26, which has received the command, displays the elongation of the chain 10. Then, the CPU 21 of the terminal device 20 transmits, to the server 40, the elongation of the chain 10, the image-taking data, the image-taking time measured by the real-time clock 28, and the image-taking position measured by the GPS 29 (Step S20).

Figure 8:
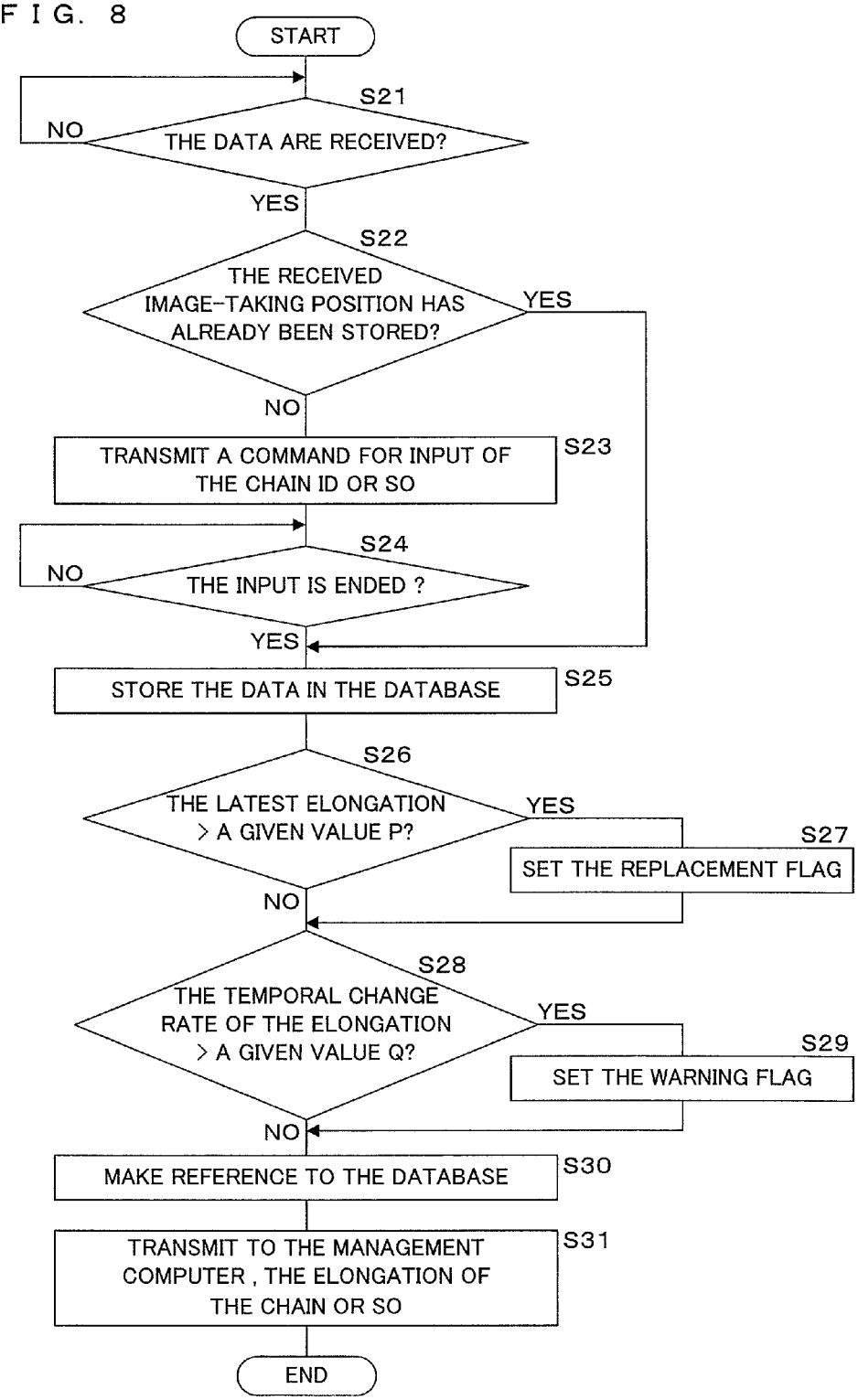
FIG. 8 is a flow chart describing a management process performed by a CPU 41 of a server.

As described above, the CPU 21 of the terminal device 20 calculates the elongation of the chain 10 based on the first or second method, and transmits the elongation of the chain 10, the image-taking data, the image-taking time and the image-taking position to the server 40. The server 40 manages information concerning the chain 10. FIG. 8 is a flow chart describing a management process performed by the CPU 41 of the server 40.

The CPU 41 of the server 40 determines whether or not the elongation of the chain 10, the image-taking data, the image-taking time and the image-taking position are received from the terminal device 20 (Step S21), and enters a standby mode until the elongation of the chain 10, the image-taking data, the image-taking time and the image-taking position are received (Step S21: NO). Upon reception of the elongation of the chain 10, the image-taking data, the image-taking time and the image-taking position (Step S21: YES), the CPU 41 of the server 40 determines whether or not the received image-taking position has already been stored in the identification table (Step S22). When the received image-taking position has not been stored in the identification table (Step S22: NO), the CPU 41 of the server 40 transmits, to the terminal device 20, a command for input of the chain ID and so forth (Step S23). Note that when the received image-taking position has not been stored in the identification table, the chain ID, user name, delivery destination and delivery address (which will hereinafter be referred to as the "chain ID and so forth") have not been stored in the identification table.

Then, the CPU 41 of the server 40 determines whether or not the input of the chain ID and so forth from the terminal device 20 is ended (Step S24), and enters the standby mode until the input of the chain ID and so forth from the terminal device 20 is ended (Step S24: NO). Upon end of the input of the chain ID and so forth from the terminal device 20, the CPU 41 of the server 40 stores the image-taking position, the chain ID and so forth in the database 45 (Step S25). In this case, the CPU 41 of the server 40 stores the image-taking position, the chain ID and so forth in the identification table, and stores, as an image-taking data address, an address, which is indicative of an unused one of storage areas of the database 45, in the identification table. Further, the CPU 41 of the server 40 stores the received image-taking time and elongation of the chain 10 in the individual table associated with the image-taking position, and stores image data in the storage area of the database 45, which is indicated by the image-taking data address.

When the received image-taking position has already been stored in the identification table (Step S22: YES), the CPU 41 of the server 40 adds the image-taking time and the elongation of the chain 10 to the individual table associated with the image-taking position, and stores image data in the storage area of the database 45, which is indicated by the image-taking data address (Step S25). Note that the image-taking time and the elongation of the chain 10 are added to the individual table and stored in the database 45 every time the management process is performed.

Next, the CPU 41 of the server 40 determines whether or not the latest elongation stored (added) in the individual table exceeds a given value P (Step S26). Note that the given value P is decided based on values influenced by a physical state of the chain, such as the diameter of the pin 72, inner diameter of the bushing 82, length of the chain 10 and diameter of a sprocket, and is set in advance in the RAM 43. When the latest elongation stored in the individual table exceeds the given value P (Step S26: YES), the CPU 41 of the server 40 sets 1 (i.e., a value indicating that the chain 10 should be replaced) in a column of the replacement flag, which is associated with the latest elongation (Step S27). Subsequently, the CPU 41 of the server 40 makes reference to the individual table, divides a difference between the latest elongation and immediately previously stored elongation by a difference between the image-taking times, associated with the elongations, to calculate a temporal change rate of the elongation, and then determines whether or not the calculated temporal change rate exceeds a given value Q (Step S28). Note that the given value Q is decided based on values influenced by a physical state of the chain, such as the diameter of the pin 72, inner diameter of the bushing 82, length of the chain 10 and diameter of a sprocket, and is set in advance in the RAM 43. When the latest elongation added to the individual table does not exceed the given value P (Step S26: NO), the CPU 41 of the server 40 moves the processing to Step S28.

When the calculated temporal change rate exceeds the given value Q (Step S28: YES), the CPU 41 of the server 40 sets 1 (i.e., a value indicating that an abnormal condition has occurred in the chain 10) in a column of the warning flag, which is associated with the latest elongation (Step S29). Subsequently, the CPU 41 of the server 40 makes reference to the database 45 (Step S30). When the calculated temporal change rate does not exceed the given value Q (Step S28: NO), the CPU 41 of the server 40 moves the processing to Step S30.

Then, the CPU 41 of the server 40 transmits, to the management computer 50, the elongation of the chain 10, the image-taking data, positional information and the image-taking time. Further, when the replacement flag associated with the latest image-taking time is 1, a message for prompting replacement of the chain 10 is transmitted to the management computer 50, and when the warning flag associated with the latest image-taking time is 1, a message indicative of occurrence of an abnormal condition in the chain 10 is transmitted to the management computer 50 (Step S31). Note that when the replacement flag associated with the latest image-taking time is 1 and when the warning flag associated with the latest image-taking time is 1, the CPU 41 of the server 40 may further transmit, to the terminal device 20, a message for prompting replacement of the chain 10 and a message indicative of occurrence of an abnormal condition in the chain 10, respectively. In such a case, in Step S21, information by which the terminal device 20 is identified is naturally further received.

In the elongation measurement system according to Embodiment 1, based on an image of the three or more aligned pins 72, 72, . . . , 72, the two adjacent inter-pin distances P1 and P2 are each calculated, so that the pitch of the outer link 70 and the pitch of the inner link 80 are calculated. When an image of the three pins 72, 72, 72 is taken, the two inter-pin distances P1 and P2 (pitches of the outer link 70 and the inner link 80) are calculated. Due to the structure of the chain 10, dimensions of the outer links 71 virtually do not change between before and after use of the chain 10, but dimensions of the inner links 81 after use are elongated as compared with those of the inner links 81 before use. Hence, a comparison is made between the two calculated inter-pin distances P1 and P2, so that the longer distance is determined as the pitch of the inner link 80 and the shorter distance is determined as the pitch of the outer link 70. Further, since the pitch of the outer link 70 and the pitch of the inner link 80 are substantially equal to each other before use, the ratio of a difference between both of the pitches to the pitch of the outer link 70 is determined as the elongation of the chain 10, thus enabling measurement of the elongation of the chain 10 without presetting the inter-pin distance before use.

Furthermore, based on an image of the four or more pins 72, the three inter-pin distances P1 to P3 are calculated, and the calculated inter-pin distances P1 to P3 are corrected by the coefficients α, β and γ having a linear relationship. Hence, even when an image of the chain 10 is taken from an oblique position and thus a distortion occurs in the image of the chain 10, errors in the inter-pin distances P1 to P3 caused by the image distortion are corrected, and the pitch of the outer link 70 and the pitch of the inner link 80 are accurately calculated, thus making it possible to accurately obtain the elongation of the chain 10.

Moreover, the operator or user can reliably recognize the elongation of the chain 10 via the display section 26, and thus can immediately recognize whether or not the chain 10 should be replaced.

Besides, the calculated elongation of the chain 10 is stored in the server 40 together with the image-taking position and image-taking time at which the image of the chain 10 is taken, so that the state of the chain 10 is meticulously managed, thus making it possible to take appropriate measures for the chain 10.

In addition, the position (image-taking position) at which the chain 10 is set is associated with the management computer 50 (external device) used by the user of the chain 10, and the measured elongation of the chain 10 is transmitted to the management computer 50 from the server 40, thus informing the user of the elongation; hence, the user can reliably recognize the chain 10 that should be replaced.

Further, when the elongation of the chain 10 exceeds the given value, the server 40 transmits information indicative of this fact to the management computer 50, thus making it possible to prompt the user to replace the chain 10 that should be replaced.

Furthermore, when the temporal change rate of the elongation of the chain 10 exceeds the given value, the server 40 transmits information indicative of this fact to the management computer 50 to inform the user of the possibility that an abnormal condition has occurred in the chain 10, thus making it possible to prompt the user to stop the use of the chain 10 and replace the chain 10, for example.

Note that the three inter-pin distances P1 to P3 are corrected in the elongation measurement system according to Embodiment 1, but four or more inter-pin distances may be corrected. Further, paint is applied to the end of each pin 72 in the elongation measurement system according to Embodiment 1, but any other means may be used as long as each pin 72 can be distinguished from its surroundings when an image of the chain 10 is taken; alternatively, instead of paint application, mirror finish may be performed on the end of each pin 72. Furthermore, when the application program is downloaded from the server 40 and stored in the ROM 22, user authentication may be performed. Moreover, the application program may be stored in advance in the ROM 22 without downloading the application program from the server 40 into the ROM 22.

(Embodiment 2)

Hereinafter, the present invention will be described in detail with reference to the drawings illustrating an elongation measurement system according to Embodiment 2. In the elongation measurement system according to Embodiment 2, the terminal device 20 transmits image-taking data of the chain 10 to the server 40 together with image-taking position and image-taking time. Then, the server 40 calculates an elongation of the chain and returns the calculated elongation to the terminal device 20, and the elongation is displayed on the display section 26 of the terminal device 20.

Figure 9:
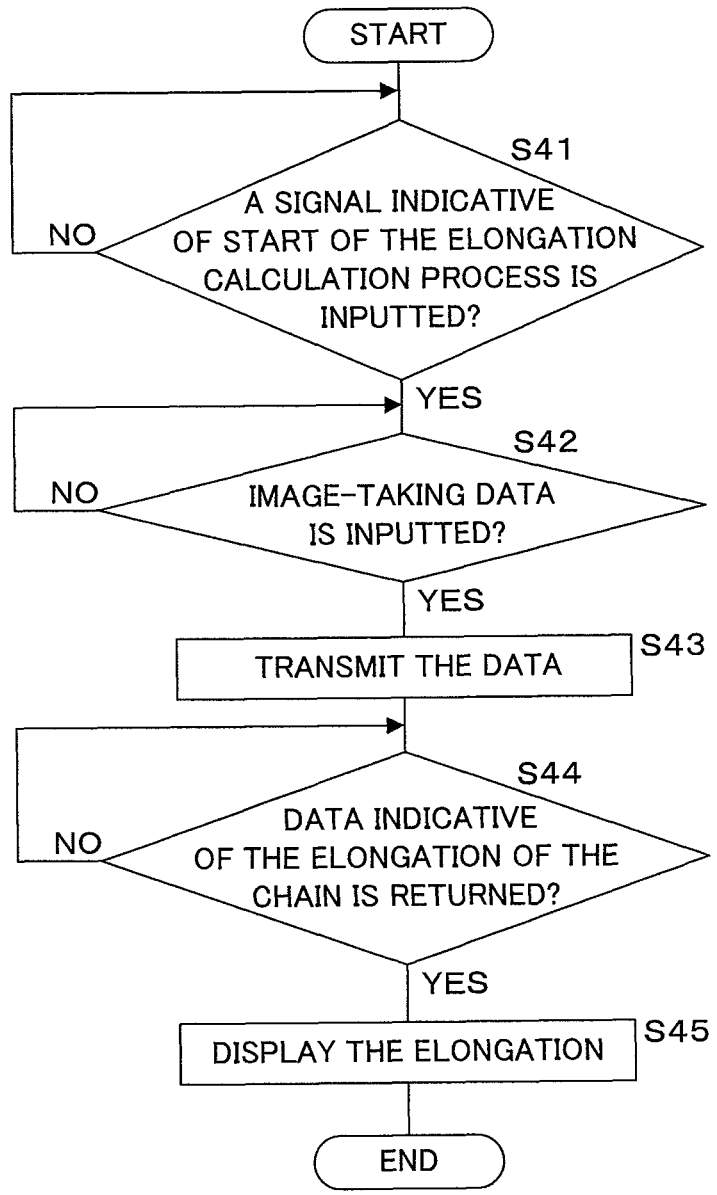
FIG. 9 is a flow chart describing a chain elongation display process performed by the CPU of the terminal device of an elongation measurement system according to Embodiment 2.

FIG. 9 is a flow chart describing a process for displaying the elongation of the chain 10, which is performed by the CPU 21 of the terminal device 20.

The CPU 21 of the terminal device 20 determines whether or not a signal indicative of start of the elongation calculation process is inputted by an operation performed on the operation section 27 (Step S41), and enters the standby mode until the signal indicative of the start of the elongation calculation process is inputted (Step S41: NO). Upon input of the signal indicative of the start of the elongation calculation process (Step S41: YES), the CPU 21 of the terminal device 20 determines whether or not image-taking data is inputted from the image-taking section 24 (Step S42), and enters the standby mode until the image-taking data is inputted (Step S42: NO). Upon input of the image-taking data from the image-taking section 24 (Step S42: YES), the CPU 21 of the terminal device 20 transmits, to the server 40, the image-taking data, the image-taking time measured by the real-time clock 28 and the image-taking position measured by the GPS 29 (Step S43).

Then, the CPU 21 of the terminal device 20 determines whether or not data indicative of the elongation of the chain 10 is returned from the server 40 (Step S44), and enters the standby mode until the data indicative of the elongation of the chain 10 is returned (Step S44: NO). Upon return of the data indicative of the elongation of the chain 10 (Step S44: YES), the CPU 21 of the terminal device 20 allows the elongation of the chain 10 to be displayed on the display section 26 (Step S45).

Figure 10:
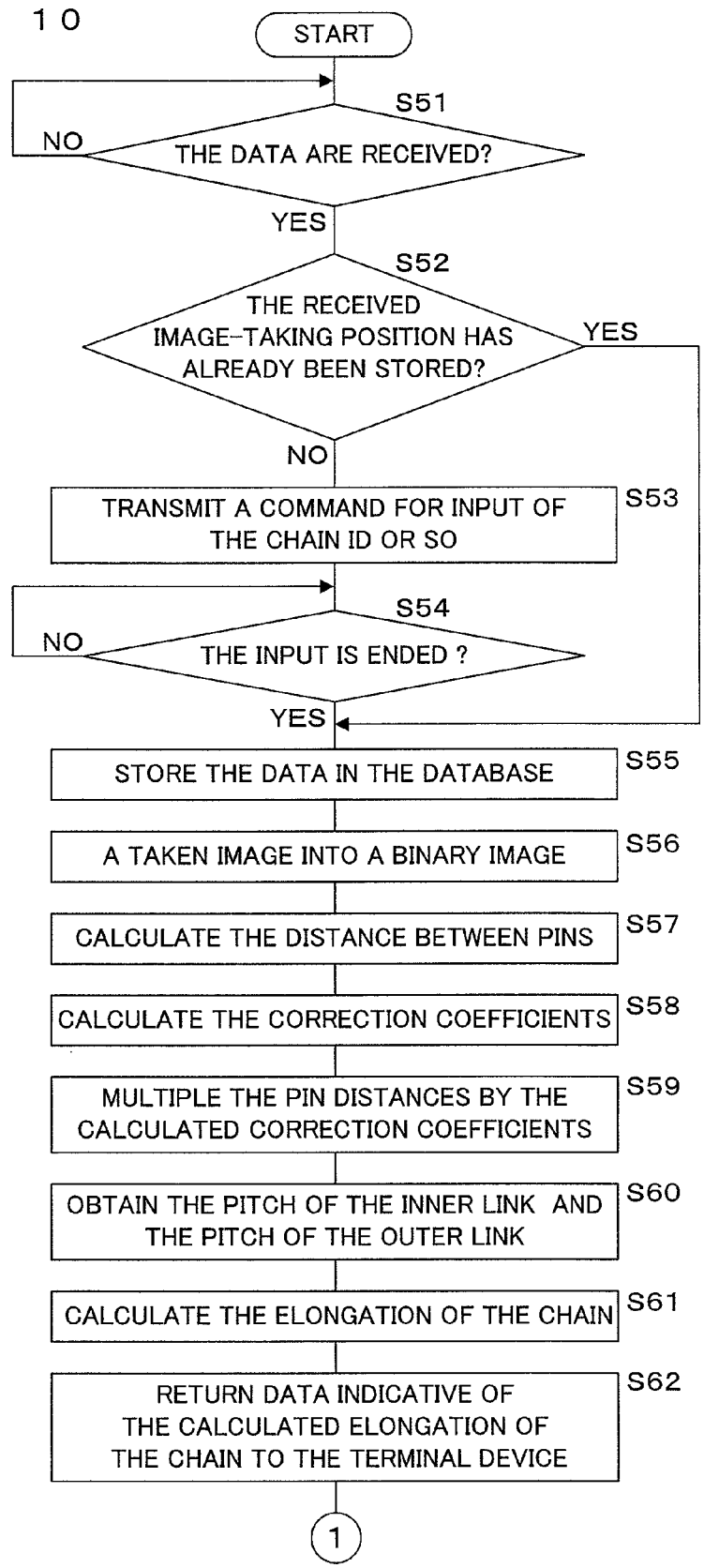
FIG. 10 is a flow chart describing an elongation calculation process and a management process performed by the CPU of the server.
Figure 11:
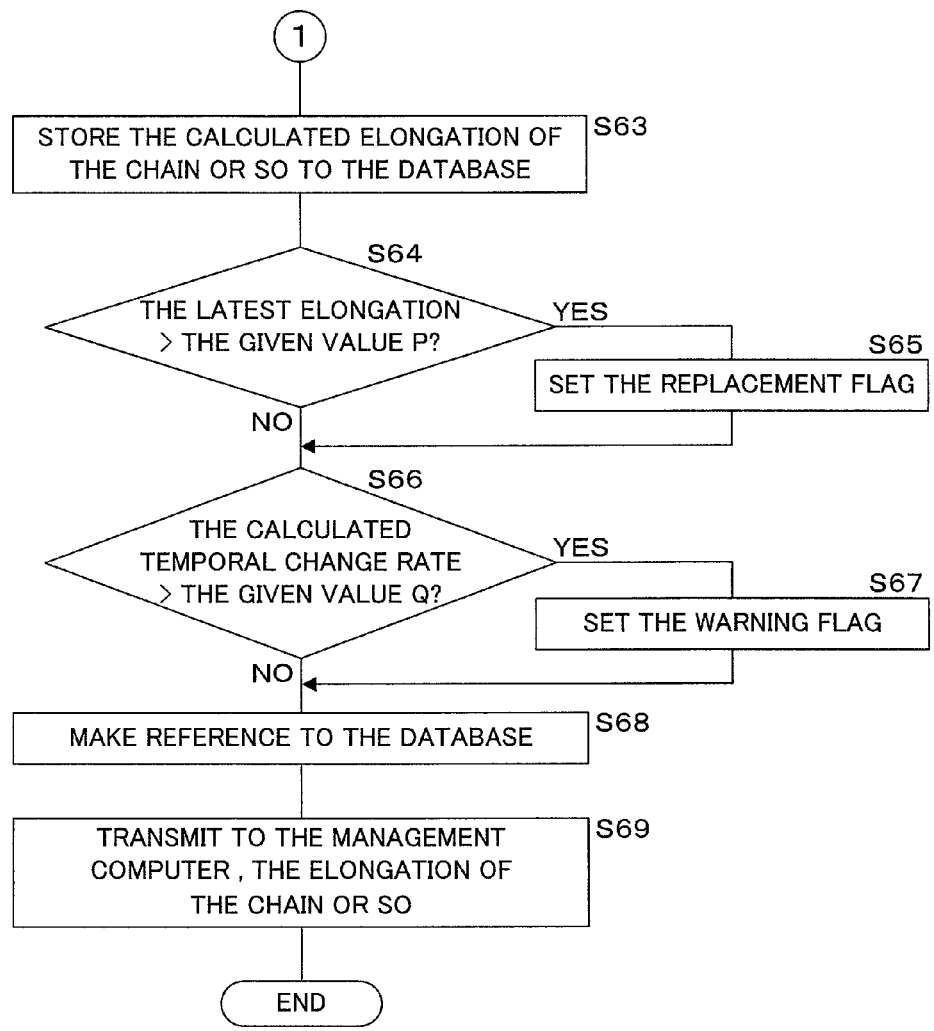
FIG. 11 is a flow chart describing the elongation calculation process and management process performed by the CPU of the server.

FIGS. 10 and 11 are flow charts describing the elongation calculation process and management process performed by the CPU 41 of the server 40.

The CPU 41 of the server 40 determines whether or not image-taking data, image-taking time and image-taking position are received from the terminal device 20 (Step S51), and enters the standby mode until the image-taking data, the image-taking time and the image-taking position are received (Step S51: NO). Upon reception of the image-taking data, the image-taking time and the image-taking position (Step S51: YES), the CPU 41 of the server 40 determines whether or not the received image-taking position has already been stored in the identification table (Step S52). When the received image-taking position has not been stored in the identification table (Step S52: NO), the CPU 41 of the server 40 transmits, to the terminal device 20, a command for input of the chain ID and so forth (Step S53). Note that when the received image-taking position has not been stored in the identification table, the chain ID, user name, delivery destination and delivery address (which will hereinafter be referred to as the "chain ID and so forth") have not been stored in the identification table.

Then, the CPU 41 of the server 40 determines whether or not the input of the chain ID and so forth from the terminal device 20 is ended (Step S54), and enters the standby mode until the input of the chain ID and so forth from the terminal device 20 is ended (Step S54: NO). Upon end of the input of the chain ID and so forth from the terminal device 20 (Step S54: YES), the CPU 41 of the server 40 stores the image-taking position, the chain ID and so forth in the database 45 (Step S55).

In this case, the CPU 41 of the server 40 stores the image-taking position, the chain ID and so forth in the identification table, and stores, as an image-taking data address, an address, which is indicative of an unused one of storage areas of the database 45, in the identification table. Further, the CPU 41 of the server 40 stores the received image-taking time in the individual table associated with the image-taking position, and stores image data in the storage area of the database 45, which is indicated by the image-taking data address.

Next, the CPU 41 of the server 40 converts a taken image into a binary image (Step S56), and extracts positions of four continuous pins to calculate the inter-pin distances P1, P2 and P3 (Step S57).

Subsequently, the CPU 41 of the server 40 calculates the correction coefficients α, β and γ by the foregoing second method (Step S58), and multiples the inter-pin distances P1, P2 and P3 by the calculated correction coefficients α, β and γ, respectively (Step S59). Then, the CPU 41 of the server 40 makes a comparison between P2·β and P1·α or P3·γ to obtain the pitch of the inner link 80 and the pitch of the outer link 70 (Step S60). Subsequently, the CPU 41 of the server 40 calculates the elongation of the chain 10 (Step S61). In this case, the CPU 41 of the server 40 calculates the elongation of the chain 10 by the foregoing expression (b) or (c).

Next, the CPU 41 of the server 40 returns data indicative of the calculated elongation of the chain 10 to the terminal device 20 (Step S62). Then, the CPU 41 of the server 40 makes reference to the database 45, and stores the calculated elongation of the chain 10 in a column of the elongation in the individual table associated with the image-taking position and image-taking time (Step S63).

Subsequently, the CPU 41 of the server 40 determines whether or not the latest elongation stored in the individual table exceeds the given value P (Step S64). Note that the given value P is set in advance in the RAM 43. When the latest elongation added to the individual table exceeds the given value P (Step S64: YES), the CPU 41 of the server 40 sets 1 (i.e., a value indicating that the chain 10 should be replaced) in the column of the replacement flag, which is associated with the latest elongation (Step S65).

Then, the CPU 41 of the server 40 makes reference to the individual table, divides a difference between the latest elongation and immediately previously stored elongation by a difference between the image-taking times, associated with the elongations, to calculate a temporal change rate of the elongation, and then determines whether or not the calculated temporal change rate exceeds the given value Q (Step S66). Note that the given value Q is set in advance in the RAM 43. When the latest elongation added to the individual table does not exceed the given value P (Step S64: NO), the CPU 41 of the server 40 moves the processing to Step S66.

When the calculated temporal change rate exceeds the given value Q (Step S66: YES), the CPU 41 of the server 40 sets 1 (i.e., a value indicating that an abnormal condition has occurred in the chain 10) in the column of the warning flag, which is associated with the latest elongation (Step S67). Subsequently, the CPU 41 of the server 40 makes reference to the database 45 (Step S68). When the calculated temporal change rate does not exceed the given value Q (Step S66: NO), the CPU 41 of the server 40 moves the processing to Step S68.

Then, the CPU 41 of the server 40 transmits, to the management computer 50, the elongation of the chain 10, the image-taking data, positional information and the image-taking time. Further, when the replacement flag associated with the latest image-taking time is 1, a message for prompting replacement of the chain 10 is transmitted to the management computer 50, and when the warning flag associated with the latest image-taking time is 1, a message indicative of occurrence of an abnormal condition in the chain 10 is transmitted to the management computer 50 (Step S69).

In the elongation measurement system according to Embodiment 2, the server 40 calculates the elongation of the chain 10, thus reducing load on the terminal device 20.

Note that the elongation of the chain 10 is calculated by the second method in the elongation measurement system according to Embodiment 2, but the elongation of the chain 10 may be calculated by the first method. In such a case, based on an image of the three or more pins 72, 72, . . . , 72, the two adjacent inter-pin distances P1 and P2 are each calculated, so that the pitch of the outer link 70 and the pitch of the inner link 80 are calculated. Then, a ratio of a difference between both of the pitches to the pitch of the outer link 70 (i.e., the elongation of the chain 10) is calculated.

Further, an application program is stored in the ROM 42 by reading the application program stored in the non-transitory medium 101, for example. Alternatively, an application program may be stored in the ROM 42 at the time of fabrication thereof or may be downloaded via a network.

The elements of the elongation measurement system according to Embodiment 2, which are similar to those of the elongation measurement system according to Embodiment 1, are identified by the same reference characters, and the detailed description thereof are omitted.

The elongation measurement systems according to Embodiments 1 and 2, which have been described thus far, are provided in order to illustrate the present invention, and therefore, the present invention may be carried out in various modes within the scope of the claims.

INDUSTRIAL APPLICABILITY

Based on an image of three or more aligned pins, adjacent inter-pin distances are each calculated, so that an elongation of a chain is calculated based on calculated pitches of outer and inner links; thus, the present invention may also be used for the purpose of measuring an elongation of a chain without presetting an inter-pin distance before use.

What is claimed is:

1. An elongation measuring apparatus for measuring an elongation of a chain based on a taken image of the chain in which a plurality of inner links and a plurality of outer links are alternately connected to each other by internally fitting pins of the outer links into cylindrical bushings of the inner links, the elongation measuring apparatus comprising:
at least one memory that stores a computer-executable program; and
at least one processor that, when the computer-executable program is executed:
receives an image of the pins, determines positions of the pins based on an image of four or more aligned pins, and calculates adjacent inter-pin distances of the four or more aligned pins from the positions of the four or more aligned pins in the received image;
calculates a pitch of the outer link and a pitch of the inner link based on the calculated inter-pin distances and that corrects the calculated pitches of the outer and inner links by coefficients having a linear relationship; and
calculates the elongation of the chain based on the corrected pitches of the outer and inner links.

2. The elongation measuring apparatus according to claim 1,
wherein the processor further calculates a ratio of a difference between the pitches of the inner and outer links to the pitch of the outer link.

3. The elongation measuring apparatus according to claim 1,
wherein the elongation measuring apparatus outputs the elongation calculated by the processor.

4. An elongation measurement system comprising:
the elongation measuring apparatus according to claim 1, wherein the processor further measures a position at which the image of the chain is taken, and measures a time at which the image of the chain is taken; and
a server that stores the elongation calculated and measured by the processor.

5. The elongation measurement system according to claim 4,
wherein the elongation stored in the server is transmitted to an external device associated with the position.

6. The elongation measurement system according to claim 5,
wherein when the elongation stored in the server exceeds a given value, information indicating that the elongation exceeds the given value is transmitted to the external device from the server.

7. The elongation measurement system according to claim 5,
wherein the server calculates, based on the time and the calculated elongation, a temporal change rate of the elongation, and when the calculated temporal change rate exceeds a given value, the server transmits information, indicating that the temporal change rate exceeds the given value, to the external device.

8. An elongation measurement system for measuring an elongation of a chain based on a taken image of the chain in which a plurality of inner links and a plurality of outer links are alternately connected to each other by internally fitting pins of the outer links into cylindrical bushings of the inner links, the elongation measurement system comprising:
a terminal device that takes an image of a chain in which a plurality of inner links and a plurality of outer links are alternately connected to each other by internally fitting pins of the outer links into cylindrical bushings of the inner links; and
a server that calculates an elongation of the chain based on the image of the chain taken by the terminal device,
wherein the server includes:
a communication interface that allows communication with the terminal device;
at least one memory that stores a computer-executable program; and
at least one processor that, when the computer-executable program is executed:
receives an image of the pins, that determines positions of the pins based on an image of four or more aligned pins, and that calculates adjacent inter-pin distances of the four or more aligned pins from the positions of the four or more aligned pins;
calculates a pitch of the outer link and a pitch of the inner link based on the calculated inter-pin distances and that corrects the calculated pitches of the outer and inner links by coefficients having a linear relationship; and
calculates the elongation of the chain based on the corrected pitches of the outer and inner links.

9. The elongation measurement system according to claim 8,
wherein the processor calculates a ratio of a difference between the pitches of the inner and outer links to the pitch of the outer link.

10. The elongation measurement system according to claim 8,
wherein the terminal device outputs the elongation calculated by the processor.

11. The elongation measurement system according to claim 8,
wherein the terminal device includes:
a measurement section that measures a position at which the image of the chain is taken; and
a timing section that measures a time at which the image of the chain is taken, and
wherein the server stores: the calculated elongation; the position measured by the measurement section; and the time measured by the timing section.

12. The elongation measurement system according to claim 11,
wherein the server transmits the stored elongation to an external device associated with the position.

13. The elongation measurement system according to claim 12,
wherein when the stored elongation exceeds a given value, the server transmits information, indicating that the elongation exceeds the given value, to the external device.

14. The elongation measurement system according to claim 12,
wherein the server calculates, based on the time and the calculated elongation, a temporal change rate of the elongation, and when the calculated temporal change rate exceeds a given value, the server transmits information, indicating that the temporal change rate exceeds the given value, to the external device.

15. A non-transitory computer-readable medium recording a computer program,
the computer program comprising steps of:
allowing a computer to calculate an elongation of a chain based on a taken image of the chain in which a plurality of inner links and a plurality of outer links are alternately connected to each other by internally fitting pins of the outer links into cylindrical bushings of the inner links;
allowing the computer to determine positions of the pins based on an image of four or more aligned pins, to calculate adjacent inter-pin distances of the four or more aligned pins from the positions of the four or more aligned pins;
allowing the computer to calculate a pitch of the outer link and a pitch of the inner link based on the calculated inter-pin distances and to correct the calculated pitches of the outer and inner links by coefficients having a linear relationship; and
allowing the computer to calculate the elongation of the chain based on the corrected pitches of the outer and inner links.

* * * * *